Dec. 26, 1967  W. B. WALLACE  3,359,687
EXPANSIBLE SEAL
Filed Aug. 17, 1964
Fig. 1.
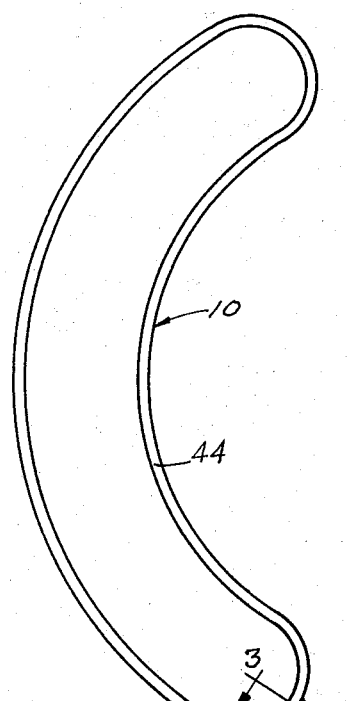
Fig. 2.
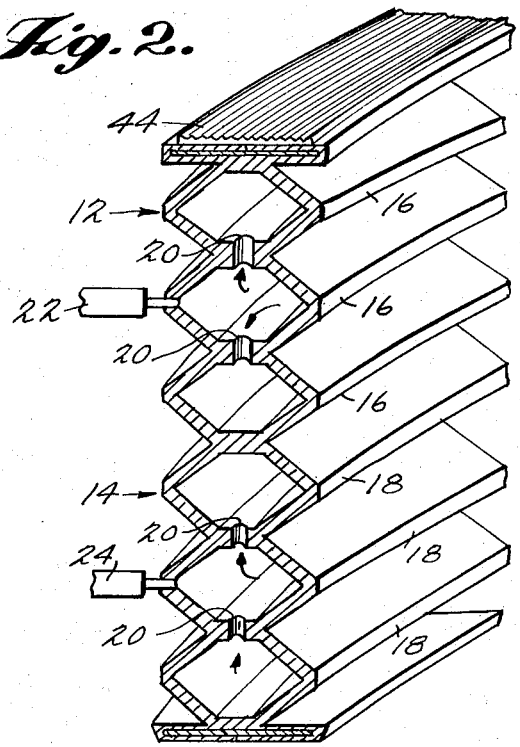
Fig. 3.
Fig. 4.
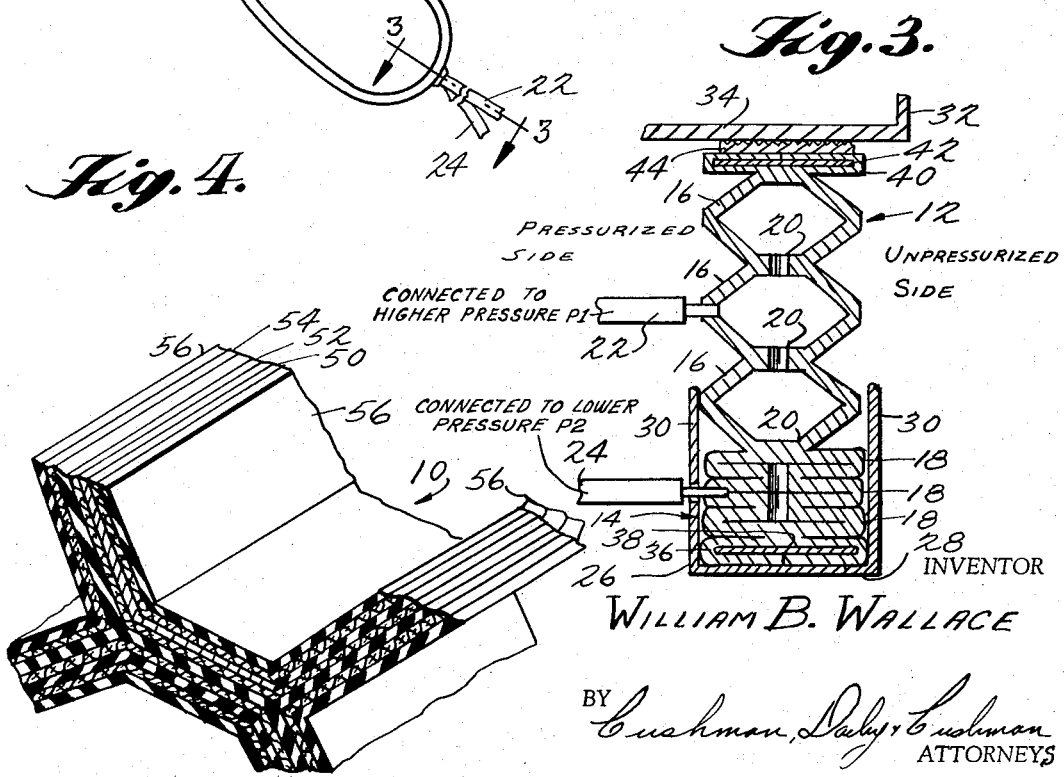
INVENTOR
WILLIAM B. WALLACE
BY Cushman, Darby & Cushman
ATTORNEYS 3,359,687
EXPANSIBLE SEAL
William B. Wallace, Dighton, Mass., assignor to Haveg Industries, Inc., Wilmington, Del., a corporation of Delaware
Filed Aug. 17, 1964, Ser. No. 389,964
7 Claims. (Cl. 49—477)

The present invention relates to inflatable seals and more particularly to plural compartment inflatable seals which are especially advantageously usable in aircraft pressurization systems.

Although the specific seal particularly described herein is employed to contain air pressure generated by the bypass compressor section of a fan-jet type aircraft engine it should be apparent that the principles of the invention are applicable to seals used to seal aircraft cockpit canopies, to seal around aircraft windows so that cabin pressurization can be maintained and in other environments where such seals are useful.

Within the nacelle of a fan-jet engine, it is necessary to prevent leakage of fan duct pressure into the engine compartment and loss of fan duct pressure. Such seal assemblies, mounted in a channel in the duct between pressurized and non-pressurized engine areas are subjected to extreme environmental conditions which must be withstood without seal deterioration or failure. Specifically, temperature extremes of −65 degrees F. to 340 degrees F., pressure differentials on the unpressurized side of the seal varying from pressure at ground level up to that of 50,000 feet altitude, as well as extremes of humidity, acceleration vibration and exposure to sand, dust, salt sea atmosphere, fugus and oil spray.

It is a primary object of the present invention to provide a seal which is durable and useful in such an extreme environment.

Another object of the invention is to provide an inflatable seal having a primary inflatable compartment and a secondary inflatable compartment arranged to inflate and protect the integrity of the seal arrangement upon failure of the primary compartment for instance, due to piercing of the compartment by a projectile or malfunctioning of the pressurizing means for the compartment.

A further object of the invention is the provision of a seal of the type described wherein each compartment is composed of a plurality of interconnected axially superimposed cells and the compartments are individually inflatable by separate means.

Yet another object of the invention is the provision of an inflatable seal of the type described which expands essentially axially to inflate and which retracts to minimum height of its own accord when deflated.

Another object of the invention is to provide a plural compartment inflatable seal composed of fabric reinforced silicone rubber.

These and other objects of the seal according to the present invention will become more clearly apparent during the course of the following detailed explanation during which reference is made to the attached drawing wherein a preferred embodiment of the seal is illustrated.

In the drawings:

FIGURE 1 is a top plan view of an inflatable seal according to the principles of the present invention;

FIGURE 2 is a fragmentary perspective view of the seal with both seal compartments inflated and sectioned to expose the interconnection of the cells of each compartment;

FIGURE 3 is a cross-sectional view of the seal taken substantially along the line 3—3 of FIGURE 1 and illustrating the seal in use between a channel in which it is received and seals at the bottom of the view and an engine duct toward which it expands and against which it is shown sealed at the top of the view, and FIGURE 4 is an enlarged fragmentary perspective view of the seal illustrating the means of reinforcement thereof.

As best seen in FIGURE 1 the inflatable seal 10 comprises a closed arcuate loop, shown configured for interposition in a fan-jet engine fan duct. Referring to FIGURE 2, the seal 10 includes a primary compartment 12 comprising a closed arcuate loop and secondary compartment 14 comprising a closed arcuate loop immediately adjacent thereto as an integral part of the seal 10. In turn each compartment 12, 14 is composed of a plurality of super-imposed cells 16, 18 each having a generally hexagonal radial sectional configuration when inflated. The cells 16, 18 of each compartment are interconnected by ports 20, but no interconnection is provided between compartments.

The primary compartment is inflatable by communicating pressurized fluid, preferably compressed air from a suitable source, to the cells 16 through the filler stem 22 sealingly connected to one of the primary compartment cells 16.

The secondary compartment is inflatable by communicating pressurized fluid, preferably compressed air from an independent source to the cells 18 through a filler stem 24 sealingly connected to one of the secondary compartment cells 18.

In use the seal 10 is preferably frictionally mounted in an axially directed channel 26 in the engine bifurcation duct, the channel including a flat, closed arcuate bottom 28 and a pair of continuous laterally spaced side walls 30 extending generally perpendicularly therefrom. The seal arrangement is completed by an abutment member 32 spaced axially from the channel and having a generally flat portion 34 extending substantially parallel to the channel bottom 28.

The seal 10 as shown additionally comprises an integral generally flat foot member 36 which encases a flat metallic shape retainer strip 38. As shown the foot 36 is slightly wider than the channel so that there is an interference fit between the seal foot and the channel which frictionally retains the seal in the channel. A similar enlargement 40 carrying a retainer 42 is defined at the axially opposite end of the seal. The shape retainers 38 and 42 serve to prevent bellowing or lateral deflection of the seal when it is subjected to relatively high differential pressures on the pressurized and unpressurized sides of the seal arrangement. A serrated resilient strip 44 secured to the axially outer end of the enlargement 40 facilitates the formation of a sealed abutment with the duct portion 34.

As seen by a comparison of FIGURES 2 and 3, by virtue of the fact that the distance between the channel bottom 28 and the abutment member 32 is substantially less than the axial extent of the fully inflated, unconfined seal of FIGURE 2, the seal cannot expand to its full height when positioned in the channel and inflated.

Two notable advantages result from the just mentioned configuration. Firstly, inflation of the seal causes axial expansion of the seal to the extent that the strip 44 resiliently sealingly engages the duct portion 34. Secondly, inasmuch as the primary and secondary seal compartments are individually inflatable, by communicating the primary compartment to a source of air pressurized at, for instance, 23 p.s.i.g. and the secondary compartment to a source of air pressurized at, for instance, 20 p.s.i.g. the primary compartment will inflate and the secondary compartment will remain collapsed.

Accordingly, it can be seen that when utilized in operating aircraft, the primary compartment being inflated and therefore extended will be more susceptible to puncture by projectiles and to blowout due to failure. In prior art inflatable seals the puncture or failure of the single compartment provided in such seals would result in loss of pressurization. However, due to the plural compartments of the novel seal arrangement described, puncture or failure of the inflated, extended first compartment will not result in loss of pressurization. Rather, upon such puncture or failure, the secondary compartment will inflate to maintain the strip 44 in resilient engagement with the duct portion 34.

Additionally, inasmuch as each compartment 12, 14 is comprised of a plurality of individual cells, upon the puncture or failure of one cell, pressurized air admitted through the associated filler stems 22, 24 and ports 20 can continue to pressurize the surviving cells, provided the puncture is small compared to the ports 20.

As discussed more fully hereinafter the seal 10 is preferably composed of a cured cold and heat resistant elastomer having included fabric reinforcement to resist inflation pressures up to 60 p.s.i.g. The seal 10 is preferably cured in a substantially retracted condition, as exemplified by the secondary compartment as illustrated in FIGURE 3 so that upon cutting off of pressure to the seal compartments 12 and 14 the seal will substantially completely deflate and retract for purposes apparent to those skilled in the art.

As can be seen from an examination of FIGURE 4, the seal 10 preferably comprises a plurality of fabric reinforcement layers 50, 52, 54 imbedded within the elastomeric material 56, fabric layers 50 and 52 surround each individual cell and the fabric layer 54 surrounds all of the cells.

The seal 10 is preferably fabricated by extruding uncured elastomeric material 56 onto a plurality of fabric tubes 50 so as to encase the fabric, surrounding each fabric reinforced elastomeric tube so formed with a tubular cloth layer 52 and extruding uncured elastomeric material 56 thereover to form a plurality of doubly reinforced tubes. The filler stems 22, 24 are preferably similarly formed.

A tape comprising uncured elastomeric material extruded so as to encase a fabric strip 54 is then laid in a mold bottom-half. A plurality of the doubly reinforced tubes just mentioned are then laid side by side on the fabric reinforced elastomeric tape and a second fabric reinforced elastomeric tape laid upon the tubes, the tapes being substantially wider than the composite width of the tubes placed therebetween.

Preferably, flat inserts corresponding with the desired interior shape of the non-expanded cells as shown in FIGURE 3 are inserted within tubes. A mold top-half is then brought down over the tapes and tubes and the tapes and tubes cured into a unitary structure.

The seal is completed by forming the ports 20 and sealingly securing the filling stems 22, 24 to their respective compartments. The metallic shape retainers 38, 42 are incorporated into the seal by folding the lateral edges of the fabric reinforced tapes which extend beyond the seal cells over the shape retainers 38 and 42 and curing or cementing them in place.

Finally the serrated resilient strip 44 is adhered to the seal utilizing uncured elastomeric material, adhesive material or the like. To facilitate fabrication the shape retainers 38, 42 and strip 44 may be coated with uncured elastomer dissolved in a solvent therefore and made integral with the seal as a single step along with the curing of the tapes and tubes as discussed hereinbefore.

It should be recognized that an advantage of the seal constructed according to the invention is that an extreme height to width ratio can be accomplished inasmuch as the seal is comprised of a series of inflatable cells mounted in single stack-like fashion and surrounded with a continuous outer wrap of elastomer and reinforcing fabric.

Because of the cross-sectional shape of the seal cells, each cell when expanded enlarges essentially axially of the seal thus reducing the section width of the seal. Accordingly, when the seal is intentionally deflated, the seal easily retracts into the channel 26 without frictional interference from the channel. While the specific cell shape shown is preferred for the reasons set forth it should be apparent that many principles of the invention described herein are advantageously applicable to seals having cells of modified shapes.

The elastomeric material utilized in the seal preferably essentially includes a silicone rubber in view of the extreme environmental conditions which the seal must withstand and the necessity of self-collapsibility of the seal upon intentional deflation. For example, a suitable mixture has been formed from 100 parts of a polymer of a methylvinyl siloxane gum, 25 parts of a finely divided reinforcing silica filler, and 1 part of 2,4-dichlorobenzoyl peroxide. The methyl-vinyl siloxane gum was prepared by adding 0.5 percent by weight of methylvinyldichlorosilane to dimethyldichlorosilane containing 0.15 mol percent methyl-trichlorosilane and hydrolyzing the resultant mixture and treating the liquid silicone hydrolysis product with ferric chloride as described in Marsden Patent 2,445,794. The mixture of the methyl-vinyl siloxane gum, silica filler and peroxide was molded into the desired shape in conventional rubber mold using conventional molding techniques, e.g. 302 degrees F. for 10 minutes followed by baking at 350 degrees for 12 hours.

There can be used any of the gums disclosed in the Marsden patent. Normally, the range of proportion is:

| | Parts |
|---|---|
| Gum | 100 |
| Filler | 10–40 |
| Peroxide | 0.5–1.5 |

As the gum there can be used any of the gums disclosed in the Marsden patent, more especially, solid, elastic, curable, hydrocarbon-substituted polysiloxanes, consisting of silicon and oxygen atoms, and methyl-substituted and vinyl-substituted silicon atoms, wherein the average ratio of the sum of the methyl and vinyl groups per silicon atom is from 1.95 to 2.00 and from 0.18 to 2.0 percent of the silicon atom are connected to at least one vinyl group.

As the filler, in addition to silica, there can be used titanium dioxide, carbon black, talc, zinc oxide, or other heat resistant fillers.

Other peroxides and per compounds can be used such as benzoyl peroxide, cumene hydroperoxide, tertiary butyl perbenzoate di(t-butyl) peroxide.

While the above-described silicone rubbers are preferred, there can be used other silicone rubbers or elastomers, such as those set forth in Krieble Patent 2,457,688, Agens Patent 2,448,756, Wright Patent 2,448,565, Sprung Patent 2,484,595, Marsden Patent 2,521,528, Hyde Patent 2,571,039, Kilbourne Patent 2,709,161, Warrick Patent 2,718,512, Polmanteer Patent 2,927,907, Konkle Patent 2,927,908 and Pike Patent 2,953,543. Thus there can be used a polymeric dimethyl siloxane containing (a) 0.4 to 5 mol percent copolymerized monomethylsiloxane and (b) copolymerized trimethylsiloxane in an amount equal to 40 to 95 percent of the number of monomethyl substituted silicon atoms, e.g., the products of Example 1 of the Krieble patent; polymeric dimethyl siloxane gums, as in the Agens patent; elastic curable, solid methyl and phenylpolysiloxane containing 1.98 to 2.00 total methyl and phenyl radicals per silicon atom, the solid polysiloxane having been obtained by condensing a liquid consisting of polymeric dimethylsiloxane containing up to 2 mol percent copolymerized monomethylsiloxane and from 3 to 30 mol percent copolymerized diphenylsiloxane, e.g., the product of Example 1 of the Sprung patent; a solid, elastic, curable, polymerized hydrocarbon substituted polysiloxane containing an average of from 1.95 to 2.05 hydrocarbon or halohydrocarbon groups per silicon atom the hydrocarbon groups being alkyl, aryl or aralkyl, e.g., methyl, ethyl, isopropyl, phenyl, naphthyl, benzyl, cyclohexyl, bromophenyl, chlorophenyl, tetrafluoroethyl, heptafluoropropyl and chlorohexafluorocyclopentyl.

Where contemplated demands upon the seal are to be less stringent, other elastomeric materials such as chlorosulphonated polyethylene rubber, nitrile rubbers like Buna-N, Hycar OR-15 Perbunam with 35 percent acrylonitrile and other flexible, shape recovering curable elastomeric material can be employed instead of the silicone rubber of the mixture.

The serrated strip can be formed from the same material as the elastomeric portion of the seal or from others of the examples set forth. For instance the serrated strip can be formed from a mixture including Buna-N (75 percent butadiene=25 percent acrylonitrile) and a silica filler.

The adhesive utilized to secure the reinforced elastomeric tape lateral ends to one another and to the metallic shape retainers is for example, uncured silicone rubber dissolved in a suitable solvent such as toluene and painted on the metallic shape retainers just prior to assembly. Where the retainers are assembled to the seal at time of curing of the seal, the retainers can be secured to the seal by coating them with sulphur chloride which results in etching of the exterior surface of the retainers at the curing temperature of the rubber and thus increases the adhesion of the rubber to the metal.

The reinforcing fabric may be any high strength, heat resistant low creep, non-wicking fabric; that formed from polyester fibers such as Dacron being preferred.

It should now be apparent that a superior seal and sealed assembly have been fully disclosed herein which efficiently accomplish all of the objects set forth hereinbefore and adequately illustrate the principles of the present invention. However, inasmuch as the specific seal embodiment described shown may be modified without departing from the invention's principles, the scope of the present invention should be understood as encompassing all such modifications as are within the spirit and scope of the following claims.

What is claimed is:

1. An expansible seal comprising: means defining a fluid-tight expansible primary compartment; means defining a fluid-tight expansible secondary compartment adjacent and substantially coextensive with said primary compartment; each compartment being defined by a plurality of walls, one wall of said walls being shared between said compartments; other walls of said plurality of walls comprising corrugated walls extending from each lateral edge of said one shared wall; said corrugated walls constituting the sidewalls of each of said compartments; said corrugated sidewalls having a predisposition toward a retracted, collapsed condition whereby said compartments are predisposed toward a collapsed condition; port means communicating separately with each compartment whereby each compartment is individually inflatable by admission of pressurized fluid to the respective compartments through the respective port means; said compartments being defined by a plurality of walls essentially composed of fabric reinforced elastomeric material cured in a retracted condition as respects said corrugated sidewalls; each compartment comprising a plurality of generally flattened tubular, interconnected inflatable cells, and the fabric reinforcement including at least one layer substantially completely surrounding each cell and at least one layer substantially completely surrounding both of said compartments.

2. An expansible seal as set forth in claim 1 wherein the elastomeric material is essentially composed of silicone rubber.

3. An expansible seal as set forth in claim 2 wherein the fabric reinforcement comprises a fabric of polyester fibers.

4. A safety assembly and system including an expansible seal, a seal receiving channel and an abutment plate, said seal being mounted in said channel for substantially axial expansion toward said abutment plate; said seal comprising means defining a fluid-tight expansible primary compartment; means defining a fluid-tight expansible secondary compartment axially adjacent and substantially coextensive with said primary compartment first fluid pressure source means; second fluid pressure source means, for the former being at higher pressure than the latter; means for communicating pressurized fluid to said primary compartment from said first pressure source means to expand said primary compartment and means for communicating pressurized fluid to said secondary compartment from said second fluid pressure source means to expand said secondary compartment; the distance between said channel and said abutment plate being substantially smaller than the composite axial extent of the fully expanded seal compartments, means for supply pressures from said pressure source means to respective of said compartments simultaneously whereby upon failure of pressure in the primary compartment, pressure in the secondary compartment will expand the same to effect sealing.

5. A seal assembly as set forth in claim 4 further including a serrated resilient sealing strip secured to said seal and arranged to engage said abutment plate upon expansion of said seal.

6. The safety seal assembly and system of claim 4, wherein said compartments are defined by a plurality of walls including corrugated walls constituting the sidewalls of each of said compartments; said plurality of walls being essentially composed of fabric reinforced elastomeric material cured in a retracted condition as respects said corrugated sidewalls, whereby said compartments are predisposed toward a collapsed condition; each compartment comprising a plurality of generally flattened tubular, interconnected inflatable cells, and the fabric requirement including at least one layer substantially completely surrounding each cell and at least one layer substantially completely surrounding both of said compartments.

7. A seal assembly including an expansible seal, a seal receiving channel and an abutment plate, said seal being mounted in said channel for substantially axial expansion toward said abutment plate; said seal comprising means defining a fluid-tight expansible primary compartment; means defining a fluid-tight expansible secondary compartment axially adjacent and substantially coextensive with said primary compartment; means for communicating pressurized fluid to primary compartment to expand said primary compartment and independent means for communicating pressurized fluid to said second compartment to expand said secondary compartment; the distance between said channel and said abutment plate being substantially smaller than the composite axial extent of the fully expanded seal comparements; and further including a generally flat metallic shape retaining band carried by said seal adjacent each compartment to prevent rolling of said seal from said channel.

References Cited
UNITED STATES PATENTS

| | | | |
|---|---|---|---|
| 2,507,360 | 5/1950 | Wicks | 49—477 X |
| 2,718,014 | 9/1955 | Mizrach et al. | 52—2 X |
| 2,720,011 | 10/1955 | Krupp | 49—477 |
| 3,086,753 | 4/1963 | Cushman | 52—2 X |
| 3,178,779 | 4/1965 | Clark et al. | 49—477 |
| 3,267,612 | 8/1966 | Horvat et al. | 49—477 X |

FOREIGN PATENTS 703,820  2/1954  Great Britain.

DAVID J. WILLIAMOWSKY, *Primary Examiner.*

PHILLIP C. KANNAN, WILLIAM E. HEATON,
*Assistant Examiners.*